Patented June 17, 1952

2,600,890

UNITED STATES PATENT OFFICE 2,600,890

TEXTILE DECORATING EMULSION

Olive-Sue Linkletter, Englewood, N. J., assignor to Interchemical Corporation, New York, N. Y., a corporation of Ohio No Drawing. Application May 25, 1951, Serial No. 228,371

4 Claims. (Cl. 260—22)

This invention relates to water-in-lacquer textile-decorating emulsions and is particularly concerned with the provision of such emulsions characterized by unusual stability, washfastness, and alkali-resistance.

Compositions comprising an aqueous medium, usually water, emulsified as the inner phase in an outer lacquer phase containing a film-forming binder, generally an organic solvent-soluble thermosetting resin, have gone into extensive use in the printing and the dyeing of textiles and similar fabrics. A pigment may be dispersed in the lacquer phase of such an emulsion: the application of such a pigmented water-in-lacquer emulsion in the printing of textile fabrics is disclosed in Jenett, 2,222,581 and 2,222,582 and in the dyeing of textile fabrics in Cassel, 2,248,696. Alternatively, a water-soluble dyestuff or dyestuff component may be dissolved in the aqueous phase of such an emulsion: the application of such a colored emulsion in the decoration of textile fabrics is described in Cassel, 2,202,283.

Alkyd resins of the glycerol-phthalate type are customarily included in the lacquer phase of such an emulsion, not only because of their film-forming properties but also because of their emulsifying characteristics. Such an alkyd resin can be used as the sole film-forming material in the lacquer phase, particularly of an emulsion of low solids content. It can also be used in conjunction with other film-forming materials such as thermosetting resins, the emulsions of which are not notably stable, in order to impart stability thereto. The use of these alkyd resins leaves much to be desired with respect to long-time stability of such emulsions, however; and, moreover, the resulting decorated fabric generally does not possess entirely satisfactory fastness to washing and scrubbing and satisfactory resistance to alkali.

I have now discovered that unusually stable water-in-lacquer textile-decorating emulsions can be prepared by utilizing, as an ingredient thereof, an alkyd resin comprising the reaction product of (1) an adduct of an alpha-unsaturated dicarboxylic acid and a terpene and (2) a partial ester of pentaerythritol with the conjoint polymerization product of styrene and dehydrated castor oil. Not only does this particular type of film-forming alkyd resin possess exceptionally good emulsification properties; but a fabric decorated therewith exhibits an improved fastness to washing and an excellent resistance to the action of alkali.

The styrene-dehydrated castor oil conjoint polymerization product forming the basis of the alkyd resin utilized in carrying out the present invention can be prepared in any desired manner. A satisfactory copolymer of this type can be prepared by heating a mixture of styrene and dehydrated castor oil in the desired proportions in the presence of a peroxide catalyst and of a mercaptan polymerization-modifier, as described in the copending application of C. J. Opp and R. E. Werner, S. N. 713,931, filed December 4, 1946, now U. S. Patent No. 2,574,753.

The present alkyd is prepared by heating such a conjoint polymer with pentaerythritol desirably in the presence of an alkaline catalyst to effect a partial alcoholysis of the former and then in turn esterifying the resulting partial ester by heating an adduct of an alpha-unsaturated dicarboxylic acid and a terpene therewith. Alternatively, the copolymer can be heated with the pentaerythritol and the adduct in a single cook to form the alkyd resin. Full details of the preparation of this type of alkyd are contained in the copending application of C. P. Opp and R. E. Werner, S. N. 713,932, filed December 4, 1946, now U. S. Patent No. 2,560,592.

For the best emulsification and for satisfactory washfastness in the resulting decorated textile, the ratio of styrene of dehydrated castor oil in the conjoint polymer should range from about 30 to 50 parts by weight of styrene to about 70 to 50 parts by weight of dehydrated castor oil. When a lower or a higher ratio of styrene to dehydrated castor oil is employed in the preparation of this copolymer, then the degree of washfastness of the decorated fabric begins to decrease to too great an extent. Excellent emulsification accompanied by excellent washfastness of the decorated textile is obtained when the conjoint polymer is prepared from about 40 parts by weight of styrene and about 60 parts by weight of dehydrated castor oil.

The ratio of pentaerythritol to such conjoint polymer may vary from a minimum of 0.5:1 to a maximum of about 1:1 on a molar basis. This minimum ratio represents the least amount of pentaerythritol that can be reacted with one mol of the conjoint polymer, the resulting partial ester still theroetically having two free hydroxyl groups for esterification with the unsaturated dibasic acid-terpene adduct. If the molar ratio is greater than the indicated maximum, then the reaction mixture, upon addition of the dibasic acid-terpene adduct, gels too fast; and the resulting alkyd has too high an acid number and can not be used for present purpose.

A sufficient amount of the unsaturated dibasic acid-terpene adduct should be esterified with the partial ester of pentaerythritol with such conjoint polymer that the final alkyd resin has a theoretical free hydroxy percentage ranging from about 0.5 to 3 and a maximum acid number of about 25. Below about 0.5% theoretical free hydroxyl, the alkyd generally possesses unsatisfactory emulsifying properties. Above about 3% theoretical free hydroxyl, the washfastness of the resulting decorated fabric is generally poor. If the alkyd has an acid number much above about 25, then the textile-decorating emulsions, especially those containing a thermosetting resin such as organic solvent-soluble melamine-formaldehyde resin, tend to be unstable and to gel rapidly. I prefer, generally, to carry out the reaction until the alkyd has an acid number of about 20 to about 25.

This dibasic acid-terpene adduct can be prepared by condensing in the known manner an alpha-unsaturated dicarboxylic acid with a terpene. A typical alpha-unsaturated dicarboxylic acid suitable for this purpose comprises maleic acid. Other acids such as fumaric acid, citraconic acid, and itaconic acid can also be used, however; and the anhydrides of these acids can be used in place of the acids themselves, the anhydrides being the equivalent of the acids for this purpose. The terpene may comprise a straight-chain terpene containing a conjugated system of double bonds, a monocyclic terpene whether or not its double bonds are conjugated, a bicyclic terpene, and the like.

As is well known, the nature of the adduct depends on the type of terpene utilized and the manner in which the reaction is carried out. For example, the reaction between a monocyclic terpene containing a conjugated system of double bonds and a suitable dibasic acid results in an adduct comprising a mixture of a Diels-Alder reaction product and a polymeric material. A monocyclic terpene whose pair of double bonds is not conjugated and the anhydride of a dibasic acid react, in the presence of an acid, to give a mixture of the Diels-Alder reaction product and the polymeric material, the terpene rapidly isomerizing to alpha-terpinene. In the absence of acid, however, these same reactants result in a mixture comprising an addition product of a different type and an interpolymerization product.

Generally, the terpene and the dibasic acid are reacted in approximately equimolar proportions although other ratios can also be employed. A description of the preparation of these dibasic acid-terpene adducts is given at pages 843 to 846 of Carleton Ellis' "The Chemistry of Synthetic Resins" (Reinhold Publishing Corporation, New York, 1935), to which as well as to the patents mentioned therein reference is made for further details. Any of these adducts, all of which are essentially polybasic acids, can be used in the production of the present styrene-castor oil copolymer alkyd. Adducts of this type are available commercially under the trade name of "Petrex" acids.

The partial ester should be cooked with the dibasic acid-terpene adduct (or the mixture of copolymer, pentaerythritol, and adduct should be cooked) until the resulting alkyd has a maximum gel time of about 25 seconds. (This gel time is the time in seconds required for a thin film of the alkyd resin spread on a plate maintained at a constant temperature 190° C. to gel or cure.) A loss in color value of the decorated fabric becomes apparent if the gel time of the alkyd is much above about 25 seconds. Generally, we prefer to heat the reaction mixture until the alkyd has a gel time of about 15 to about 25 seconds.

Where the copolymer is prepared in accordance with the disclosure in the copending application of Opp and Werner, S. N. 713,931, the mixture of styrene and dehydrated castor oil is heated to a temperature preferably not in excess of about 275 to 300° C. in the presence of a suitable peroxide catalyst such as tertiary butyl hydroperoxide, lauryl peroxide, and the like and of a mercaptan, especially an alkyl mercaptan, until the reaction has been carried to the desired extent. The peroxide catalyst should be present in a catalytic amount, and the mercaptan is advantageously present in an amount ranging from about 0.5 to 5% of the weight of the styrene. The reaction of the copolymer with the pentaerythritol is effected by heating to a temperature not substantially in excess of about 230° C. until the desired extent of reaction has been accomplished; and the reaction of the resulting partial ester with the adduct is similarly effected by heating until the resulting alkyd has the desired acid number and gel time. Desirably, each reaction is carried out in the presence of an inert gas such as carbon dioxide so that products of a lighter color are obtained.

The preparation of alkyd resins suitable for use in carrying out the present invention is illustrated by the following examples:

Example A

In a flask, equipped with a stirrer, a reflux condenser and a trap for the removal of water, are placed 600 parts (40%) of styrene and 900 parts (60%) of dehydrated castor oil (all parts by weight in this and other examples) together with about 16 parts of tertiary butyl hydroperoxide and about 12 parts of tertiary butyl mercaptan. This mixture is heated to a temperature of about 260° C. and is maintained at this temperature until the viscosity of the resulting styrene-dehydrated castor oil copolymer is about 377 poises at 30° C.

568 parts (1 mol) of this 40-60 styrene-dehydrated castor oil copolymer are cooled to about 175° C. and 73 parts (0.54 mol) of pentaerythritol are added thereto over a period of 15 to 20 minutes. A trace of calcium oxide is added to catalyze the esterification. The mixture is then heated to 230° C. and is maintained at this temperature with agitation for about 1½ hours, or until the reaction product is clear when it is first flowed out on glass.

This partial ester is cooled to about 205° C. and 168 parts (0.78 mol) of "Petrex" acid (a terpene-maleic anhydride adduct) are added thereto. The mixture is then heated to 230° C. over a period of half an hour and is maintained at this temperature until the reaction product has a gel time of 20 to 25 seconds on a cure plate maintained at a constant temperature of 190° C. The resulting alkyd resin, which has a free hydroxyl percentage of about 0.9 and an acid number of 24 to 26, is reduced to 50% solids by the addition of Solvesso 100 (highly aromatic solvent naphtha having a boiling range of 310° F. to 365° F.) thereto.

Example B

An alkyd of substantially similar suitability can be prepared by replacing the 568 parts of the 40-60 styrene dehydrated castor oil copolymer of Example A with 491 parts (1 mol) of a 50-50 styrene-dehydrated castor oil copolymer prepared in the same manner.

Example C 646 parts (1 mol) of a 30-70 styrene-dehydrated castor oil copolymer can be substituted for the 568 parts of the 40-60 styrene-dehydrated castor oil copolymer of Example A, and an alkyd useful for the present purpose prepared therefrom.

Example D

Similarly suitable alkyds can be prepared from such a copolymer of styrene and dehydrated castor oil with varying amounts of pentaerythritol and dibasic acid-terpene adduct within the indicated limits. Other dibasic acid-terpene adducts can also be used.

The use of such an alkyd resin in the preparation of a water-in-lacquer vehicle concentrate suitable for use in the preparation of textile-decorating emulsions is illustrated by the following example:

Example I

A vehicle concentrate is prepared by mixing together the following ingredients:

| | |
|---|---|
| 50% solids solution of Example A | 40 |
| Solvesso #100 (highly aromatic solvent naphtha having a boiling range of 310 to 365° F.) | 20 | and emulsifying into the resulting lacquer:

| | |
|---|---|
| 10% aqueous solution of diammonium phosphate | 30 |
| Water | 10 |

The resins of Examples B to D can be similarly formulated into vehicle concentrates.

This vehicle concentrate can be thinned or cut by the addition of further organic solvent thereto and the emulsification of further water thereinto in the proportions necessary to give a textile-decorating vehicle having the body and the viscosity desired:

Example II

A textile-decorating vehicle or clear having a solids content of 1% is prepared from the following ingredients:

| | |
|---|---|
| Vehicle concentrate of Example I | 5 |
| Mineral spirits | 20 |
| Water | 75 |

The resulting emulsion is unusually stable and retains its stability for a prolonged period of time.

Example III

A textile-decorating vehicle or clear having a solids content of 0.4% is prepared from the following ingredients:

| | |
|---|---|
| Vehicle concentrate of Example I | 2 |
| Mineral spirits | 23 |
| Water | 75 |

This water-in-lacquer emulsion is also unusually stable.

The solution of the alkyd resin can also be cut directly to form such a clear:

Example IV

A clear having a solids content of 1% is prepared by mixing the following:

| | |
|---|---|
| 50% solids resin solution of Example A | 2 |
| Mineral spirits | 23 | and emulsifying into the resulting lacquer:

| | |
|---|---|
| 10% aqueous solution of diammonium phosphate | 5 |
| Water | 70 |

Textile-decorating compositions can be prepared from such vehicles or clears by mixing a color-concentrate containing a pigment or a water-soluble dyestuff therewith. The proportions in which the respective color concentrate and the respective vehicle are mixed depend, of course, on the depth of shade desired in the finished fabric. Typical textile-decorating compositions are illustrated by the following examples:

Example 1

A pigmented color concentrate or ink comprising a water-in-lacquer emulsion consisting of the following ingredients:

| | |
|---|---|
| Pigment | 9 to 40 |
| Organic solvent-soluble urea-formaldehyde or melamine-formaldehyde resin | 9 to 30 |
| Fatty acid (to disperse the pigment and the resin) | 1 |
| Water | Up to 10 |
| Solvesso #100, turpentine and/or pine oil | Balance |
| | 100 | is mixed with the vehicle clear of Example II, III, or IV in proportions within the range of 1:1 to 1:150 to produce a water-in-lacquer textile printing paste, the particular ratio depending on the depth of shade desired.

A fabric, printed with this composition and dried by heat to cure the resins, is satisfactorily scrubfast, washfast and light-washfast and possesses good resistance to alkali.

Example 2

A textile-decorating composition containing a water-soluble dyestuff in the aqueous phase is prepared by mixing together the following:

| | |
|---|---|
| 50% solids resin solution of Example A | 2 |
| Mineral spirits | 48 | and emulsifying into the resulting lacquer:

| | |
|---|---|
| 10% aqueous solution of a water-soluble dye or dyestuff component | 40 |
| Water | 110 |

The color strength can be varied by changing the proportion of aqueous dyestuff solution.

Compared with the customary glycerol-phthalate type of alkyd, the present alkyd resin produces emulsions that possess far superior stability and that remain stable for far longer periods of time. The colored water-in-lacquer emulsions containing the present alkyd are similarly far more stable and remain usable (printable or dyeable) for a much longer period of time than the same type of emulsions formulated from the ordinary glycerol-phthalate alkyd. The resistance of a fabric decorated with the present alkyd-containing emulsion to washing and especially to the action of alkali is definitely superior to that of a fabric decorated with the usual glycerol-phthalate alkyd-containing emulsion.

The present alkyd exhibits a similar superiority for use in water-in-lacquer textile-decorating emulsions even over similarly prepared alkyds such as that in which phthalic acid is used in place of the adduct of an alpha-unsaturated dicarboxylic acid and a terpene. In particular, the present specific type of alkyd is especially characterized by its superior emulsification properties and by the superior alkali-resistance exhibited by a fabric decorated with an emulsion containing it. The finished fabric, in addition, possesses an improved color value.

Moreover, the present alkyd has excellent compatibility with ethyl cellulose, a film-forming material often incorporated in the lacquer phase of a water-in-lacquer textile-decorating emulsion. Emulsions containing both the present alkyd and ethyl cellulose possess excellent rheological properties and produce decorated fabrics having a better color value than that obtained when ethyl cellulose is used alone.

Although unusually stable water-in-lacquer emulsions can be prepared from the present alkyd, satisfactory lacquer-in-water emulsions have not been formulated therefrom.

This application is a continuation-in-part of application Serial No. 713,929, filed December 4, 1946, now abandoned.

I claim:

1. A water-in-lacquer textile-decorating emulsion, the lacquer phase of which comprises a vaporizable water-immiscible organic solvent containing, as an emulsifying film-forming material, an alkyd resin comprising the reaction product of (1) and adduct of an alpha-olefinically unsaturated dicarboxylic acid and a terpene and (2) an alcoholysis product of 0.5 to 1 mol of pentaerythritol with 1 mol of the conjoint polymerization product of about 30 to 50 parts by weight of styrene and 70 to 50 parts by weight of dehydrated castor oil, said alkyd resin having a free hydroxyl percentage ranging from 0.5 to 3, a maximum acid number on the order of 25, and a maximum gel time on the order of 25 seconds on a cure plate maintained at a temperature of 190° C., and being soluble in said organic solvent.

2. A water-in-lacquer textile-decorating emulsion, the lacquer phase of which comprises a vaporizable water-immiscible organic solvent containing, as an emulsifying film-forming material, an alkyd resin comprising the reaction product of (1) an adduct of an alpha-olefinically unsaturated dicarboxylic acid and a terpene and (2) an alcoholysis product of 0.5 to 1 mol of pentaerythritol with 1 mol of the conjoint polymerization product of 40 parts by weight of styrene and 60 parts by weight of dehydrated castor oil, said alkyd resin having a free hydroxyl percentage ranging from 0.5 to 3, a maximum acid number on the order of 25, and a maximum gel time on the order of 25 seconds on a cure plate maintained at a temperature of 190° C., and being soluble in said organic solvent.

3. The textile-decorating emulsion as claimed in claim 2, in which the alpha-unsaturated dicarboxylic acid comprises maleic acid.

4. A water-in-lacquer textile-decorating emulsion, the lacquer phase of which comprises a solution of a thermo-setting synthetic resin in a vaporizable water-immiscible organic solvent containing, as an emulsifying film-forming material, an alkyd resin comprising the reaction product of (1) an adduct of maleic acid and a terpene and (2) an alcoholysis product of 0.5 to 1 mol of pentaerythritol with 1 mol of the conjoint polymerization product of 40 parts by weight of styrene and 60 parts by weight of dehydrated castor oil, said alkyd resin having a free hydroxyl percentage ranging from 0.5 to 3, a maximum acid number on the order of 25, and a maximum gel time on the order of 25 seconds on a cure plate maintained at a temperature of 190° C., and being soluble in said organic solvent.

OLIVE-SUE LINKLETTER.

REFERENCES CITED

The following references are of record in the file of this patent:

UNITED STATES PATENTS

| Number | Name | Date |
|---|---|---|
| 2,450,627 | Bloch | Oct. 5, 1948 |